Patented May 20, 1952

2,597,302

UNITED STATES PATENT OFFICE 2,597,302

PROCESS FOR UTILIZATION OF THE GAS WASHING LYE FROM ALUMINUM ELECTROLYSIS IN CRYOLITE PRODUCTION

Halvard Dale, Ardalstangen, Norway, assignor to A/S Ardal Verk, Oslo, Norway

No Drawing. Application July 26, 1948, Serial No. 40,786. In Norway July 28, 1947

4 Claims. (Cl. 23—88)

Until now no satisfactory solution has been found for the problem of how to utilize the valuable fluoride compounds which are present in the gases that are drawn off from closed aluminum furnaces, especially because—for economic reasons—there has been little freedom of action. Usually the gases are washed with a soda solution and aluminum fluoride is added to the clarified washing water containing NaF. Hereby cryolite is produced which is filtered off, dried, and again added to the electrolytic baths. As is known aluminum fluoride is very expensive. If it is to be made suitable for transformation it must fulfil certain requirements. In the first place it must exist in the form of a preferably fresh fluoride hydrate. These requirements give rise to difficulties. Further, according to experience, only a cryolite of poor or medium quality is obtained. In this manner the expensive aluminum fluoride, which in itself is very valuable for aluminum electrolysis, and of which it is also possible to make direct use, is reduced in value. Also, the cryolite so recovered costs nearly as much as new purchases of cryolite. The consequence of this has been that many aluminum plants have entirely refrained from working up the washing lye and confined themselves to drawing off and washing out the furnace gases in order to prevent inconvenience to the workmen of the plant and to prevent damage to vegetation. Some factories have also gone over to the so-called dry method with electro-filtration. With regard to the prevention of damage to vegetation the effect is very good. But hereby the fluorine compounds are obtained nearly exclusively in the form of a dust which is contaminated by iron compounds and is not of great usefulness. Lye containing sodium fluoride is only obtained in small quantities according to this working method.

However, in all these cases one has to give up a not inconsiderable advantage which the closed Söderberg electrolysis furnaces are intended to offer, viz., the perfect recovery of as much fluorine as possible for the electrolysis. The quantities that can be recovered are so large that it is of great importance to continue working on this problem in order to economize with these materials containing fluorine which are definitely not available in very abundant quantities. In the following a process is described which is not only a practical but also an economically favourable solution. As for practical reasons the washing lye has a relatively low concentration of dissolved fluorine compounds and is contaminated by various disturing materials, it is not possible to extract pure cryolite direct from them, especially if it is desired only to use simple clarifying and decantation processes. It is wrong in principle to add expensive highgrade materials to the dissolved sodium fluoride as a component to cryolite as has hitherto usually been done in the case of aluminum fluoride.

Therefore, according to the new method, the principle is to bring the washing lyes containing sodium fluoride into reaction with such materials containing aluminum which either at the same time undergo a refining process themselves or have not yet reached the highest degree of refining, and also preferably have a specific reactivity. These additional materials should be comparatively cheap and their absolute value should in no manner be reduced; on the contrary it should be increased as is the case in every sound technical process.

The first thought that presents itself is to use aluminate lye as this is obtained in oxide factories. No doubt this lye is suitable for the conversion when the above requirements are fulfilled, but in normal pure condition it is still relatively too expensive and it presupposes that an oxide plant is located in the immediate neighbourhood of the aluminum works so that no great costs will be incurred for transport or concentration. It has appeared that it is considerably more interesting and useful to employ, e. g., the oxide compounds that can be extracted by acid decomposition from cheap raw materials, rich in silicic acid, which are available in all countries. By careful disproportionation of the aluminum salts so obtained it is possible to extract oxide products which according to their particular structure are highly reactive especially in relation to soda lye. As the investigations have shown these are very suitable materials with which the sodium fluoride washing lyes can be converted directly or in the form of aluminate.

If, for instance, a suspension is produced by adding to the wash lye equivalent quantities of a reactive monohydrate of the kind that can be obtained by the decomposition of clay with sulphurous acid, and it is stirred for some hours at about 60–100 degrees, the following reaction will take place directly:

$$6NaF + AlO(OH) + H_2O = Na_3AlF_6 + 3NaOH$$

In order to make the reaction complete carbonic acid must be introduced simultaneously or at the end, so that the soda lye produced is converted to sodium bicarbonate:

$$3NaOH + 3CO_2 = 3NaHCO_3$$

These reactive aluminum oxide hydrates are easily soluble in 10–20% soda lye. If this method is chosen the initial aluminum salts may be contaminated by iron, as such salts, of course, are even cheaper. The aluminate solution so produced is thereupon filtered or decanted and added to the clarified sodium fluoride lye. It is expedient only to use so much lye that soda solution, produced by blowing carbonic acid into the precipitation, can be disposed of in the circuit of this working method.

According to the process involving aluminum fluoride as well as according to the new process the sodium fluoride existing in the washing lye, i. e. especially the fluorine extracted from the furnace gases, is used once more for the aluminum electrolysis. By the addition of $AlF_3$, it is true, about twice as much cryolite is obtained as according to the method here suggested, but the only reason for this is the actual addition of aluminum fluoride.

According to the new method a cheap oxide product is used the production costs of which only amount to ½–⅔ of the price of finished oxide. It has been calculated that according to the new method the recovered cryolite is 30–50% cheaper than according to the old method. Unless the monohydrate can or must be bought somewhere else, the additional advantage is achieved that the aluminum plant, in a separate little works, can produce the oxide product from cheap domestic raw materials in the subsidiary plant which is necessary for the decomposition of the washing lyes. In order to obtain an annual production of 12,000 tons of aluminum such a works must supply a reactive oxide product per day containing about 100–200 kg. $Al_2O_3$.

According to the new method it is also possible to use aluminum shavings, waste sheet aluminum, etc., although this more expensive than according to the processes referred to above. Nevertheless this is an advantage from an economic point of view compared with the aluminum fluoride method, particularly if the aluminum shavings are activated with a little soda lye or materials containing mercury, and are thus brought into direct reaction with the wash lye containing sodium fluoride. It is also an advantage to extract reactive monohydrates which can be used according to the method here recommended, by means of a known wet or dry process of refining scrap alloys whether acid or alkaline.

Examples (1) 500 liters of washing lye of 32 g. NaF per litre were contained in a corrosion-resistant vessel and 3,500 g. $Al_2O_3$ were added in the form of reactive oxide hydrate which had been extracted from monobasic sulphite and contained about 32% $Al_2O_3$, 0.28% $Fe_2O_3$, and 61 per cent water. It was stirred for 20 hours at 85 degrees while carbonic acid was introduced simultaneously during the last 5 hours. In the end the solution had a pH of 8.8. The conversion to cryolite was 94.3%.

(2) A crude oxide of 91% $Al_2O_3$ which was produced from labradorite by decomposition with nitric acid, was dissolved in 15–20 per cent NaOH at 70 degrees. The aluminate lye was filtered or only clarified by sedimentation. It contained 30 g. $Al_2O_3$ at a mol proportion of 1:2.2. It was mixed with the clarified NaF lye from the washing plant, i. e. with 300 litres of washing lye of 20 g. NaF per litre. 48.5 litres of aluminate lye were used. After stirring for 15 hours with simultaneous introduction of $CO_2$-gas the pH value was 8.0. 94.8% of NaF had been converted to cryolite.

(3) 600 litres of gas washing lye of 28 g. NaF per litre which had been made free from iron by means of a little free NaOH and 3,900 g. of pure aluminum sheet scrap which had first been activated, was brought into contact with flowing lye. Also, $CO_2$-gas was constantly being introduced. After 22 hours with pH at 9.0 a yield of 93.8% was obtained. The cryolite so extracted was practically free from iron.

(4) To 250 litres of gas washing lye of 25 g. NaF per litre an aluminate lye was added from which separated impurities had been filtered, and which contained 700 g. aluminum. This had been extracted from scrap over an active oxide hydrate produced from chloride. Also, $CO_2$-gas was constantly being introduced. After 20 hours pH had attained a value of 8.5 and 96% NaF had been separated as cryolite.

I claim:

1. A process for the production of cryolite, $Na_3AlF_6$, from fluorine and hydrogen fluoride contained in the waste gases from the electrolytic production of aluminum, which comprises treating said waste gases with an alkaline aqueous solution of a compound of sodium to form sodium fluoride from the hydrogen fluoride contained in the waste gases, separating the sodium fluoride containing solution from the insoluble impurities therein, treating the filtered fluoride solution with alkali soluble highly reactive aluminum monohydroxide, AlOOH, obtained from the decomposition of clay with sulphurous acid, thereby precipitating cryolite, $Na_3AlF_6$, with the formation of sodium hydroxide in the reaction solution, treating the reaction solution with sodium bicarbonate in an amount to provide a pH in the solution between 8 and 9 to thereby precipitate a further amount of cryolite, the aforesaid steps being carried out at a temperature ranging from about 40 to about 100° C.; and removing the formed cryolite from the solution and drying the same.

2. A process as in claim 1 wherein the sodium compound forming the alkaline treating solution reacting with the waste gases is sodium hydroxide and wherein the amount of sodium hydroxide in such solution is adjusted to correspond to the total amount of fluoride, added aluminum, monohydroxide and alkali necessary to maintain the necessary conditions for the precipitation of the cryolite.

3. A process as in claim 1 wherein the steps of treating the fluorine and hydrogen fluoride containing gases with alkali, aluminum monohydroxide, and with carbonic acid forming compounds are conducted at a temperature of from 60 to about 100° C.

4. A process as in claim 3 wherein the aluminum monohydroxide is dissolved in a 10–20% sodium hydroxide solution to react with the sodium fluoride containing solution derived from the waste gases.

HALVARD DALE.

REFERENCES CITED

The following references are of record in the file of this patent:

UNITED STATES PATENTS

| Number | Name | Date |
|---|---|---|
| 1,842,443 | Carter | Jan. 26, 1932 |
| 2,031,554 | Torchet | Feb. 18, 1936 |
| 2,196,077 | Morrow | Apr. 2, 1940 |
| 2,231,309 | Weber | Feb. 11, 1941 |

FOREIGN PATENTS

| Number | Country | Date |
|---|---|---|
| 463,092 | Great Britain | Mar. 22, 1937 |
| 481,467 | Great Britain | Mar. 11, 1938 |

OTHER REFERENCES

Jones: "Inorganic Chemistry," page 265, 1947 ed. Blakiston Co., publishers, Philadelphia.

J. W. Mellor's "Inorganic and Theoretical Chemistry," vol. 5, pp. 273, 274, 284–286. Longmans, Green & Co., N. Y., publishers.

"Handbook of Chemistry and Physics," 28th ed., pages 336, 337. The Chem. Rubber Publishing Co., Cleveland.